United States Patent Office 3,579,603
Patented May 18, 1971

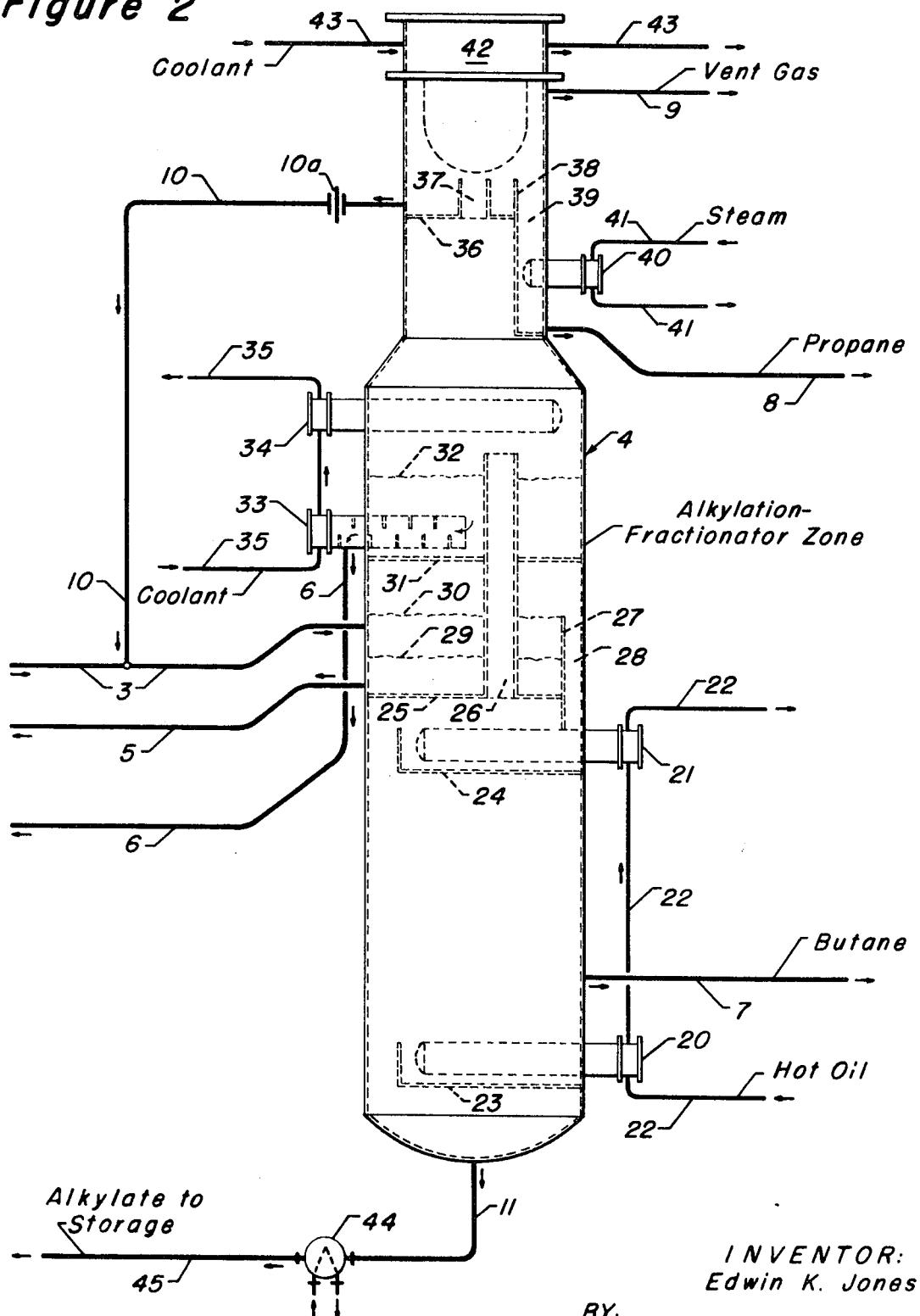

3,579,603
PROCESS UTILIZING LIQUID ACID SETTLING IN AN ALKYLATION-FRACTIONATOR
Edwin K. Jones, Kenilworth, Ill., assignor to Universal Oil Products Company, Des Plaines, Ill.
Filed June 4, 1969, Ser. No. 830,344
Int. Cl. C07c 3/54
U.S. Cl. 260—683.48     10 Claims

ABSTRACT OF THE DISCLOSURE

An isoparaffin-olefin admixture is alkylated with a liquid acid alkylation catalyst (HF or $H_2SO_4$) and the total reaction effluent from the alkylator is passed to an alkylation-fractionator vessel which provides a settling zone therein for separating the liquid catalyst. The hydrocarbon phase undergoes fractionation and separate fractions are removed from above and below the settling zone. The process produces high octane alkylated hydrocarbons utilizing a simplified flow scheme where a single vessel separates the total reaction effluent.

BACKGROUND OF THE INVENTION

This invention relates to a catalytic alkylation process. It particularly relates to a process for producing high octane alkylated hydrocarbons. It specifically relates to a process for the production of high octane alkylated hydrocarbons utilizing a processing system including an alkylation-fractionator zone.

It is well known in the prior art that catalytic alkylation utilizing sulfuric acid or hydrofluoric acid as the catalyst is an important chemical tool for preparing alkylated hydrocarbons and derivatives thereof. The commercial and industrial demand for these products is exemplified by the demand for isoparaffin hydrocarbons and alkyl-substituted benzenes of the gasoline boiling range and with the demand for alkyl-substituted aromatics suitable for conversion for surfactants, e.g., detergents, wetting agents, and the like.

The catalytic alkylation process to which the present invention is especially applicable consists of a process in which a mixture of hydrocarbons containing isoparaffins such as isobutane, isopentane, and the like, and olefins such as propylene, butylenes, isobutene, amylenes, and the like, are mixed intimately in the presence of a strong acid catalyst such as hydrofluoric acid or sulfuric acid for a time sufficient to complete the reaction. The effluent from the reaction zone contains isoparaffin hydrocarbons of higher molecular weight than the isoparaffins in the original mixture. Isobutane has been used almost exclusively because of its reactivity and availability to produce high quality alkylate products. Accordingly, for convenience, the term "alkylate" as used in the specification and claims is intended to embody the higher molecular weight reaction product from the alkylation reaction. In similar manner among the olefins, butenes have been used almost exclusively. Propylene and the pentenes, and even higher boiling olefinic hydrocarbons, can be used according to their availability.

SUMMARY OF THE INVENTION

Accordingly, it is an object of this invention to provide a process for producing high octane alkylated hydrocarbons.

It is another object of this invention to provide a novel alkylation-fractionator apparatus.

Therefore, the present invention provides a process for producing high octane alkylated hydrocarbons which comprises the steps of: (a) continuously contacting an isoparaffin-olefin admixture with a liquid acid alkylation catalyst in an alkylation reaction zone; (b) continuously passing the total reaction zone effluent into an alkylation-fractionator zone; (c) withdrawing settled acid catalyst from an intermediate portion of said alkylation-fractionator zone as an intermediate fraction and recycling at least a portion of said fraction back to said alkylation reaction zone; (d) withdrawing isoparaffinic hydrocarbon from a second intermediate portion of said alkylation-fractionator zone as a second intermediate fraction and recycling said fraction to the alkylation reaction zone; (e) withdrawing paraffinic hydrocarbon from a lower portion of said alkylation-fractionator zone as a side-cut fraction; (f) withdrawing condensed normally gaseous paraffinic hydrocarbons from a portion of said alkylation-fractionator zone; and (g) removing high octane alkylated hydrocarbons from a bottoms portion of said alkylation-fractionator zone as product from the process.

Further, my invention provides for an alkylation-fractionator apparatus comprising in combination: (a) a vertically elongated housing having at least one fluid inlet thereto and at least two fluid outlets therefrom to discharge separated fractions; (b) means supplying heat to fluid maintained in a lower portion of said housing; (c) means supplying heat to fluid maintained in an intermediate portion of said housing; (d) first horizontal partition means having vapor riser means communicating with an intermediate portion of said housing and weir means extending upwardly from the partition means to retain fluid thereon and to form a vertical fluid passageway between said intermediate and lower portions of said housing; (e) second horizontal partition means having vapor riser means for communicating with an upper portion of said housing and positioned transversely across said housing above said first partition means to form a fluid withdrawal zone; (f) means supplying cooling to fluid maintained in or withdrawn from the upper portion of said housing above said second horizontal partition means and said fluid withdrawal zone; (g) third horizontal partition means having vapor riser means for communicating with the top portion of said housing and positioned transversely across said housing above said second partition means to form a second fluid withdrawal zone; (h) weir means in combination with said third partition means to form an uppermost fluid reservoir-stripper, said fluid reservoir-stripper having disposed therein means for supplying heat to the bottom portion of said reservoir-stripper; and (i) means supplying cooling for the condensing of vapors above said third horizontal partition.

As will be described hereinafter in greater detail, the essence of my invention simplifies the design of an alkylation unit by using only a single alkylation-fractionator to separate the alkylation reactor effluent hydrocarbons into individual product streams, and when utilizing hydrogen fluoride as the liquid acid alkylation catalyst, my alkylation-fractionator may also be utilized to strip the hydrogen fluoride from hydrocarbons. Further, my invention may be utilized for liquid acid alkylation catalysts including hydrogen fluoride and sulfuric acid catalyst.

My invention can be more clearly described and illustrated with reference to the attached drawings which are schematic representations of preferred embodiments of my invention.

Figure 1:
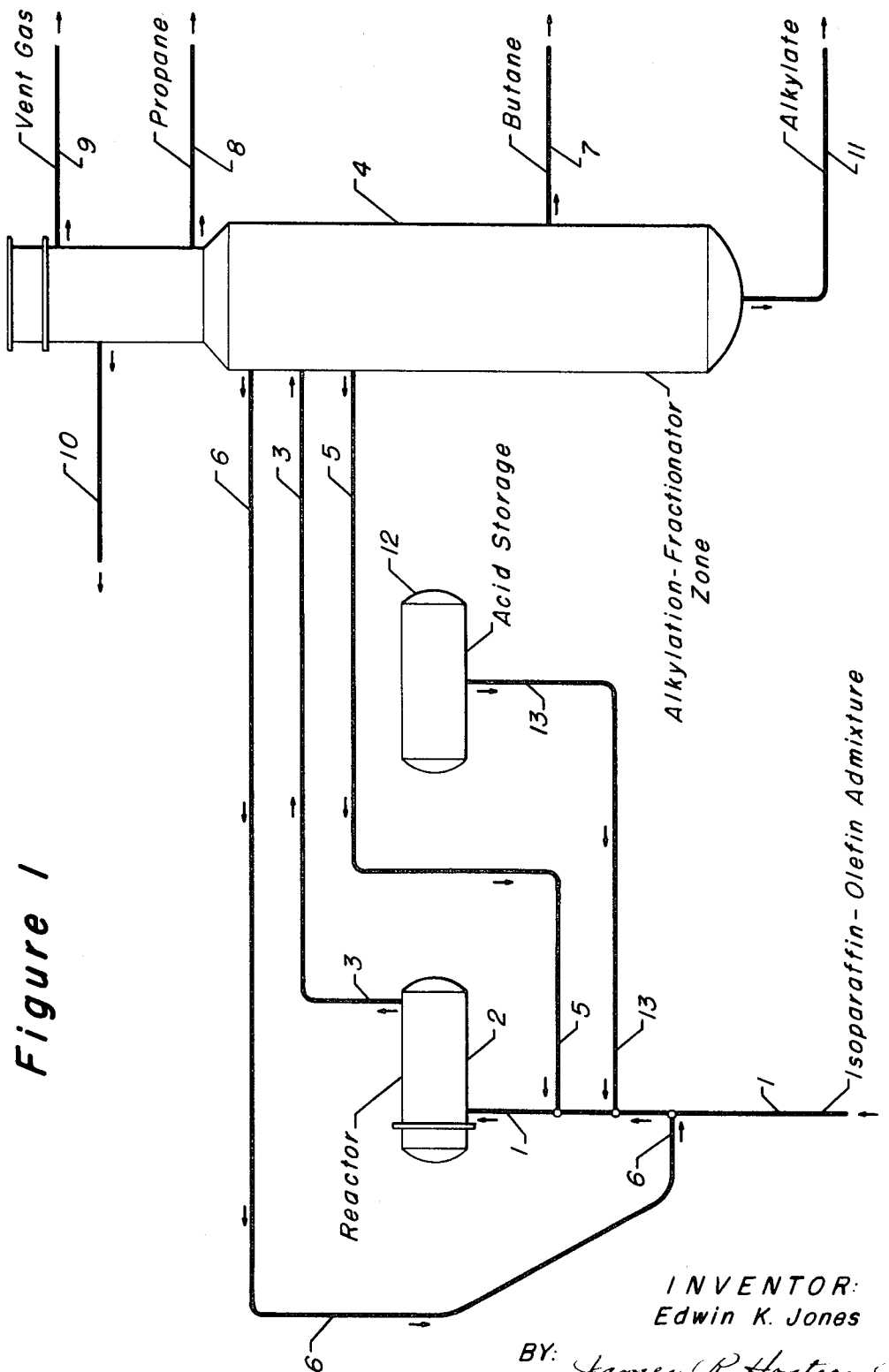
Referring to FIG. 1, the isoparaffin-olefin admixture is passed via line 1 into alkylation reaction zone 2. My process is particularly applicable to the alkylation of isobutane with a butene-containing feedstock, although the process is also applicable to other isoparaffinic hydrocarbons and other olefin hydrocarbon feedstock to produce motor and aviation alkylates or higher boiling aliphatic alkylated compounds. Thus, the isoparaffin hydrocarbon to be alkylated may comprise isobutane, isopentane, one or more of the isohexanes, mixtures of the aforementioned isoparaffins as well as the branched chain heptanes and other aliphatic hydrocarbons or branched type and chain structure. My process may also be utilized for the alkylation of aromatic hydrocarbons such as the benzene hydrocarbons, preferably benzene, to make detergent type products.

The olefinic hydrocarbon utilized as the alkylating agent in my invention comprises olefinic hydrocarbons such as propylene, 1-butene, 2-butene, isobutylene, the isomeric amylenes, the hexenes, the heptenes and higher molecular weight olefinic hydrocarbons such as the $C_{11}$–$C_{15}$ olefins for the production of detergent alkylates. The preferred olefinic hydrocarbons for use in my invention have, however, from 3 to 5 carbon atoms per molecule.

The isoparaffin-olefin feed mixture is contacted with a liquid acid alkylation catalyst in alkylation reaction zone 2. The preferred liquid acid alkylation catalysts are sulfuric acid and hydrogen fluoride. The term "hydrogen fluoride" alkylation catalyst as used herein is intended to include catalyst wherein hydrogen fluoride is the essential active ingredient. Thus, it is within the scope of this term to use substantially anhydrous hydrogen fluoride containing various additives such as boron trifluoride. Ordinarily, commercially available anhydrous hydrogen fluoride will be charged to the alkylation reaction zone as catalyst. It is, however, possible to use hydrogen fluoride containing as much as 2.5% water by weight.

The total reaction zone effluent, including the liquid acid alkylation catalyst, is continuously passed via line 3 directly into the alkylation-fractionator zone 4.

Alkylation-fractionator zone 4 comprises means for separating isoparaffinic hydrocarbon, settled acid catalyst, normally gaseous paraffinic hydrocarbon and high octane alkylated hydrocarbons that are present in the total reactor effluent passing thereto. A particularly preferred means for making this separation is described hereinafter with respect to FIG. 2.

Settled acid catalyst is withdrawn via line 5 from an intermediate portion of alkylation-fractionator zone 4 (hereinafter called zone 4) as an intermediate fraction and at least a portion of this fraction is passed from zone 4 via line 5 to alkylation reactor 2. If desired, a portion of this fraction may be passed to regenerator means (not shown) wherein the acid catalyst is regenerated in a regeneration zone.

Isoparaffinic hydrocarbon is withdrawn from zone 4 via line 6 from a second intermediate portion of zone 4 as a second intermediate fraction and this fraction is recycled to alkylation reaction zone 2 via lines 6 and 1.

Paraffinic hydrocarbon is withdrawn from a lower section of zone 4 as a side-cut fraction and is represented by line 7. Normally, gaseous paraffinic hydrocarbons that have been condensed are withdrawn, preferably, from an upper portion of zone 4 via line 8 as a first upper fraction. Vent gas, if any, is removed from zone 4 via line 9.

Acid catalyst may be withdrawn, preferably, from a second upper portion of zone 4 as a second upper fraction for recycle to the alkylation reaction zone or to the alkylation-fractionator zone. This stream is represented by line 10 passing through orifice 10a, in FIG. 2.

High octane alkylated hydrocarbons from a bottoms portion of zone 4 are removed as product from the process via line 11.

Fresh liquid acid catalyst may be added to the process from acid storage vessel 12 via lines 13 and 1.

A preferred embodiment of my invention is shown as FIG. 2. Line 3 contains the total reaction zone effluent passing into alkylation-fractionator 4. As can be seen in the drawing, alkylation-fractionator apparatus 4 comprises, in combination, a vertically elongated housing having at least one fluid inlet thereto and at least 2 fluid outlets therefrom to discharge separated fractions. In a preferred embodiment, the fluid inlet is located at an intermediate portion of the housing and fluid outlets are located at the top of the housing, at intermediate portions of the housing, in the lower portion of the housing and the bottom of the housing. In the drawing, line 3 represents the fluid inlet to alkylation-fractionator zone 4. Lines 5, 6, 7, 8, 9, 10 and 11 represent fluid outlets from alkylation-fractionator 4.

Alkylation-fractionator 4, in a lower portion of the housing, has means supplying heat to fluid maintained in a lower portion of the housing and in an intermediate portion of the housing. In the drawing, the housing is shown with a lower reboiler 20 and side-cut reboiler 21 that supplies heat to the lower and intermediate portions of the housing via a hot oil system, represented by line 22 passing through reboilers 20 and 21. As shown in the drawing, reboilers 20 and 21 are located in wells 23 and 24, respectively.

The alkylation-fractionator apparatus housing contains first horizontal partition means 25 having vapor riser means 26 communicating with an intermediate portion of the housing and weir means 27 extending upwardly from partition means 25 to retain fluid thereon and to form a vertical fluid passageway 28 between the intermediate and lower portions of the housing. In the drawing, a settled acid catalyst phase is represented by the numeral 29 and lighter material is represented by the numeral 30.

Alkylation-fractionator apparatus housing contains second horizontal partition means 31 having vapor riser means 26 for communicating with an upper portion of the housing and is positioned transversely across the housing above first partition means 25 to form a fluid withdrawal zone 32.

Cooling is supplied to fluid maintained in the upper portion of the housing above second horizontal partition means 31 and above fluid withdrawal zone 32 by condenser 34 and subcooler 33. Coolant via line 35 passes first through subcooler 33 which may contain baffles and the like and then through condenser 34.

The housing contains third horizontal partition means 36 having vapor riser means 37 for communicating with the top portion of the housing and is positioned transversely across the housing above the second partition means 31 to form a second fluid withdrawal zone. Weir means 38 in combination with third partition means 36 from an uppermost fluid reservoir-stripper 39 which has disposed therein heating means 40 that is supplied with steam via line 41 to supply heat to the bottom portion of reservoir-stripper 39. Coolant is supplied to cooling means 42 via coolant line 43. Cooler 44 and line 45 are utilized in conjunction with alkylate being removed from zone 4 via line 11.

As will be understood by one skilled in the art, alkylation-fractionator zone 4 operates so that the zone formed between horizontal partition means 25 and 31 is a settling zone to take advantage of the fact that the hydrogen fluoride acid catalyst, for example, is heavier than the hydrocarbon mixture so that the catalyst gravitates downwardly to partition 25 for removal via line 5 from the alkylation-fractionator. The remaining hydrocarbon containing only dissolved acid catalyst overflows via downcomer 28 and into well 24 where it is heated by side-cut vaporizer reboiler 21. The remaining liquid over-flows and enters a stripper section between side-cut reboiler 21 and lower reboiler 20. Normal butane vapors leave the alkylation-fractionator zone via line 7 and alkylate is removed from the zone via lines 11 and 45. The vapor from the stripping section or from reboiler 21 enters a rectification or fractionation section via vapor riser means 26 where part of the isobutane vapors are condensed by condenser 34. Uncondensed vapors enter rectification or fractionation section above exchanger 34 where propane is separated from isobutane. When hydrogen fluoride is utilized as the alkylation catalyst, the hydrogen fluoride catalyst also passes overhead with the propane. The propane and hydrogen fluoride vapors pass through vapor riser means 37 and are condensed in a water or refrigerated exchanger 42. The condensed liquid flows into an acid settling section above partition 36 and the hydrogen fluoride is gravitated into the acid settling section. The propane, stripped of hydrogen fluoride in the reservoir-stripper 39 is pressured to storage via line 8 while a portion of the propane may be gravitated back into the upper portion of the housing as reflux. The hydrogen fluoride, as set forth hereinabove, may be stripped out of the propane. The isobutane is separated as a liquid bottoms product above partition 31 from the propane rectification or fractionation section and is gravitated into the isobutane receiving section 32 where it is passed to alkylation reactor 2 through subcooler 33 via lines 6 and 1.

PREFERRED EMBODIMENT

In a particularly preferred embodiment of my invention, this invention provides a process for producing high octane alkylated hydrocarbons which comprises the steps of: (a) continuously contacting an isobutane-olefin admixture with hydrogen fluoride alkylation catalyst in an alkylation reaction zone; (b) continuously passing the total reaction zone effluent into a single alkylation-fractionator zone; (c) withdrawing settled hydrogen fluoride catalyst from an intermediate portion of said alkylation-fractionator zone as an intermediate fraction and recycling at least a portion of said fraction to said alkylation reaction zone; (d) withdrawing isobutane from a second intermediate portion of said alkylation-fractionator zone as a second intermediate fraction and recycling said fraction to the alkylation reaction zone; (e) withdrawing paraffinic hydrocarbon from a lower portion of said alkylation-fractionator zone as a side-cut fraction; (f) withdrawing condensed normally gaseous paraffinic hydrocarbons from said alkylation-fractionator zone; (g) withdrawing a hydrogen fluoride catalyst fraction from said alkylation-fractionator zone and admixing said fraction with the reaction zone effluent of step (b) passing to the alkylation-fractionator zone; and (h) removing high octane alkylated hydrocarbons from a bottoms portion of said alkylation-fractionator zone as product from the process.

It is apparent that the present invention provides a process for producing high octane alkylated hydrocarbons utilizing a simplified flow scheme and a novel alkylation-fractionator apparatus which is more economical and efficient than previous prior art designs.

I claim as my invention:
1. A process for producing high octane alkylated hydrocarbons which comprises the steps of:
   (a) continuously contacting an isoparaffin-olefin admixture with a liquid acid alkylation catalyst in an alkylation reaction zone;
   (b) continuously passing the total reaction zone effluent into an alkylation-fractionator, said fractionator including a settling zone in the intermediate portion thereof for separating said liquid catalyst;
   (c) withdrawing settled acid catalyst from said settling zone as an intermediate fraction and recycling at least a portion of said fraction back to said alkylation reaction zone;
   (d) withdrawing isoparaffinic hydrocarbon from an intermediate portion of said alkylation-fractionator above said settling zone as a second fraction and recycling said fraction to the alkylation reaction zone;
   (e) withdrawing normal paraffinic hydrocarbon from the lower portion of said alkylation-fractionator as a side-cut fraction;
   (f) withdrawing condensed normally gaseous paraffinic hydrocarbons from the upper portion of said alkylation-fractionator; and
   (g) removing high octane alkylated hydrocarbons from the bottom of said alkylation-fractionator as product of said process.

2. The process according to claim 1 wherein said liquid acid alkylation catalyst is sulfuric acid alkylation catalyst.

3. The process according to claim 1 wherein said liquid acid alkylation catalyst is hydrogen fluoride alkylation catalyst.

4. The process according to claim 1 wherein said isoparaffin-olefin admixture is formed from isobutane and an olefin having from 3 to 5 carbon atoms per molecule.

5. The process according to claim 1 wherein said isoparaffin-olefin admixture is formed from isobutane and a butene.

6. The process according to claim 1 wherein fresh liquid acid alkylation catalyst is added to the alkylation reaction zone.

7. The process according to claim 3 wherein a second stream of acid catalyst is withdrawn from said upper portion of said alkylation-fractionator zone as recycle to the alkylation reaction zone.

8. A process for producing high octane alkylated hydrocarbons which comprises the steps of:
   (a) continuously contacting an isobutane-olefin admixture with hydrogen fluoride alkylation catalyst in an alkylation reaction zone;
   (b) continuously passing the total reaction zone effluent into a single alkylation-fractionator, said fractionator including a settling zone in the intermediate portion thereof for separating said liquid catalyst;
   (c) withdrawing settled hydrogen fluoride catalyst from said settling zone as an intermediate fraction and recycling at least a portion of said fraction to said alkylation reaction zone;
   (d) withdrawing isobutane from an intermediate portion of said alkylation-fractionator above said settling zone as a second fraction and recycling said fraction to the alkylation reaction zone;
   (e) withdrawing normal paraffinic hydrocarbon from a lower portion of said alkylation-fractionator as a side-cut fraction;
   (f) withdrawing condensed normally gaseous paraffinic hydrocarbons from the upper portion of said alkylation-fractionator;
   (g) withdrawing a hydrogen fluoride catalyst fraction from said upper portion of said alkylation-fractionator and admixing said fraction with the reaction zone effluent of step (b) passing to the alkylation-fractionator; and
   (h) removing high octane alkylated hydrocarbons from the bottom of said alkylation-fractionator as product of said process.

9. The process according to claim 8 wherein said isobutane-olefin admixture is formed from isobutane and an olefin having from 3 to 5 carbon atoms per molecule.

10. The process according to claim 8 wherein fresh hydrogen fluoride alkylation catalyst is added to the alkylation reaction zone.

References Cited

UNITED STATES PATENTS

| | | | |
|---|---|---|---|
| 2,365,426 | 12/1944 | Molique | 260—683.59 |
| 2,520,391 | 8/1950 | Findlay | 260—683.59 |
| 3,249,650 | 5/1966 | Fenske | 260—683.48 |
| 3,368,966 | 2/1968 | Borst, Jr. et al. | 260—683.62 |
| 3,501,536 | 3/1970 | Borst, Jr. | 260—683.48 |

FOREIGN PATENTS

| | | | |
|---|---|---|---|
| 745,203 | 10/1966 | Canada | 260—683.48 |

PAUL M. COUGHLAN, JR., Primary Examiner

G. J. CRASANAKIS, Assistant Examiner

U.S. Cl. X.R.

260—683.62